United States Patent [19]

Whiting et al.

[11] 4,103,959
[45] Aug. 1, 1978

[54] HOLD DOWN PLATE FOR CAMPER UNITS

[76] Inventors: Wesley W. Whiting, 83 Kingsbury Ave.; John A. Anderson, 4422 Ryan St., both of Eugene, Oreg. 97404

[21] Appl. No.: 776,500

[22] Filed: Mar. 11, 1977

[51] Int. Cl.² .............................................. B60P 3/32
[52] U.S. Cl. ........................ 296/23 MC; 105/368 T; 280/179 A
[58] Field of Search ............... 296/23 MC; 248/361; 280/179 A; 105/368 T, 369 R

[56] References Cited
U.S. PATENT DOCUMENTS

| | | | |
|---|---|---|---|
| 3,475,049 | 10/1969 | Overhulser | 296/23 MC |
| 3,767,252 | 10/1973 | Hathaway | 296/23 MC |
| 3,781,057 | 12/1973 | Manuel | 296/23 MC |

Primary Examiner—Richard A. Bertsch

[57] ABSTRACT

A plate for securement to the front wall of a truck box and having an offset portion extending outwardly past the truck box to receive the end of a camper tie down arrangement. The plate has openings therein in alignment with fastener receiving openings in the box for convenient securement to the truck box front wall without box alteration.

6 Claims, 4 Drawing Figures

U.S. Patent  Aug. 1, 1978  4,103,959
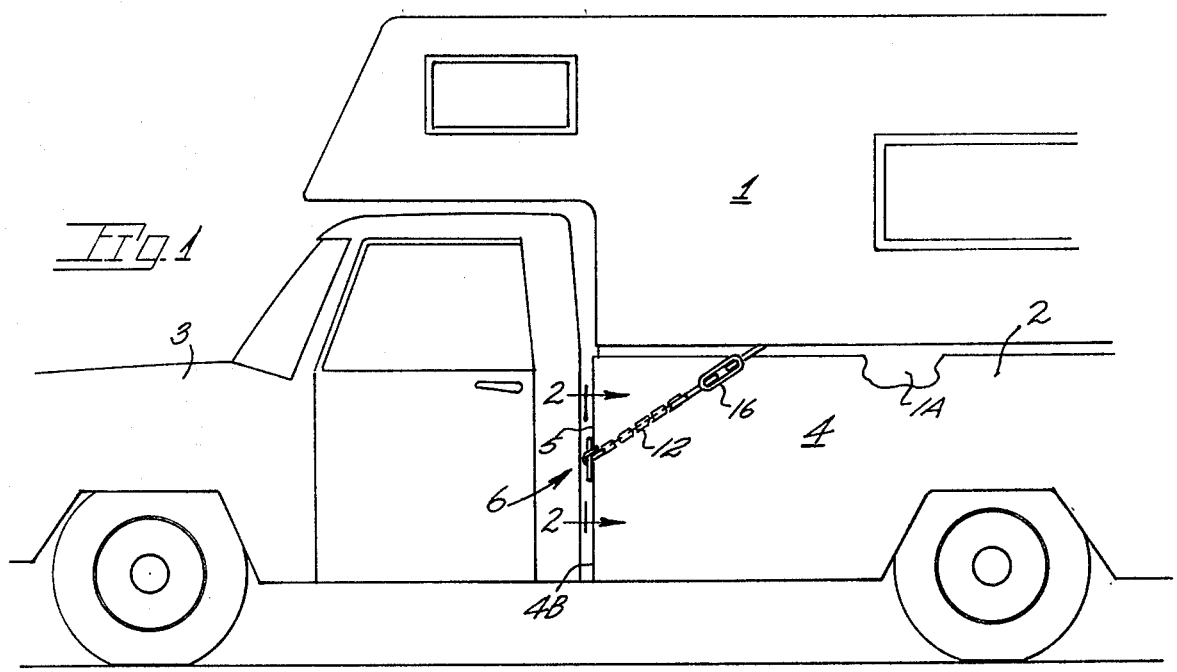
Fig. 1
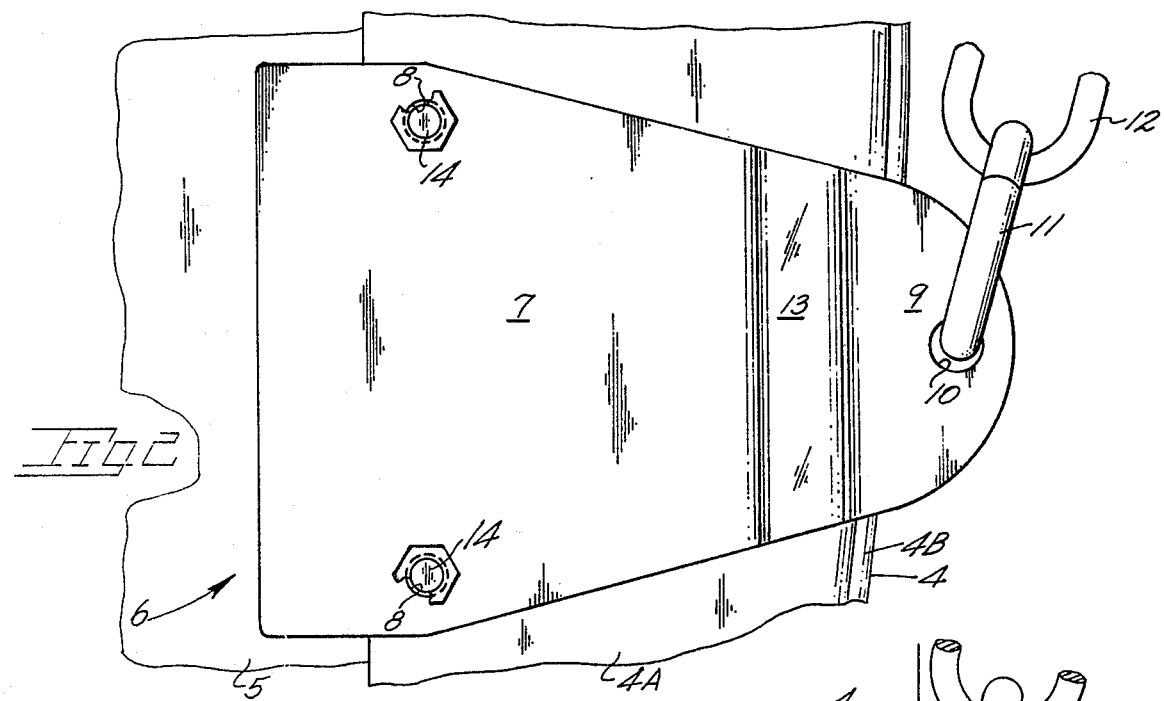
Fig. 2
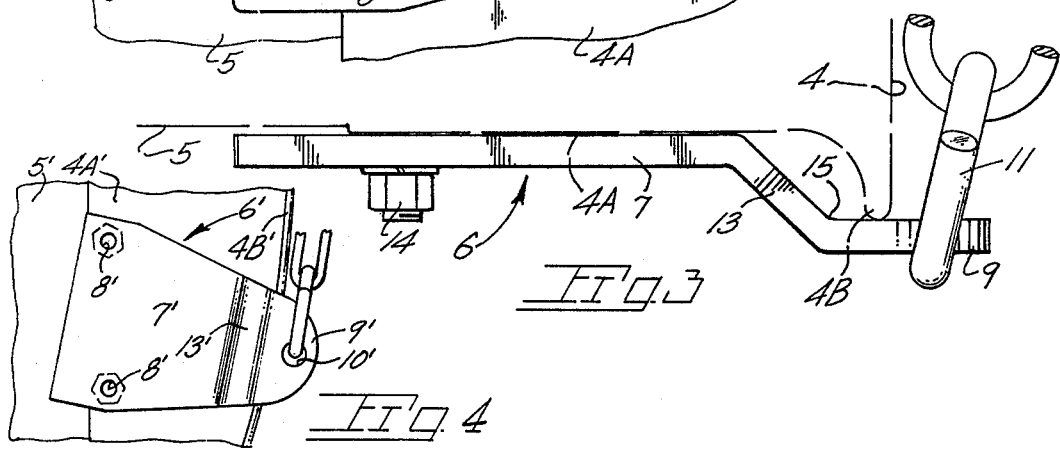
Fig. 3
Fig. 4

HOLD DOWN PLATE FOR CAMPER UNITS

BACKGROUND OF THE INVENTION

The present invention relates generally to equipment attachable to a truck box for the purpose of securing a camper unit in place within said box.

In common use today are inhabitable, self-contained dwellings removably disposed in the box or load carrying space of a truck. An attractive feature of these self-contained units, termed campers by the public, is the fact that they may be readily removed from the truck box thereby returning the truck from a recreational to its original utilitarian status.

Numerous arrangements have been proposed and utilized for securing camper units in place within the truck boxes and against the substantial forces encountered during road travel. Angular brackets have been attached to truck box interiors in a permanent manner but are objectionable from an appearance standpoint and because they present a risk of injury in that they project outwardly a distance from the box. Such brackets are normally sold in sets of four at a substantial cost and do not fasten to reinforced areas of the box. Such brackets are permanently mounted on the truck box sidewalls.

SUMMARY OF THE PRESENT INVENTION

The present invention is embodied in a bracket of plate-like construction for securement to the front wall of a pick up truck box and thereat providing an extremely strong attachment point for camper hold down means.

The plate structure is configured so as to abut with the truck box front wall and projects outwardly therefrom in an offset manner. The outwardly projecting portion of the plate structure is apertured to receive tie down means which commonly comprises a tensionable member and a take up component such as a turnbuckle. That portion of the plate structure in abutment with the box wall is also apertured to receive fastener assemblies passing through existing openings in the box wall. In conventional truck box construction, a row of fastener assemblies attaches the flanged sidewall panel of the truck box to the box front wall or panel. The joined box components overlap one another with aligned openings therein receiving bolt and nut fastener assemblies. The overlapped box components provide an extremely strong, ideal area for plate attachment.

When in place, the present hold down plate or bracket is largely inconspicuous with only a small portion extending outwardly beyond the box sidewall.

Loads imparted to the plate are generally along a rearwardly and upwardly directed vector which the truck box is highly capable of withstanding.

Important objects of the present invention include the provision of a hold down plate readily attachable to a truck box without box alteration and which, when in place, is largely inconspicuous by reason of being located between the truck box and cab; the provision of a hold down plate mounted as a pair and when so mounted are fully capable of withstanding all normal loads to retain the camper unit against rearwardly and upwardly shifting within the truck box; the provision of a hold down plate or irregular configuration compatible with existing truck box construction and partaking of reinforced truck box areas; the provision of a hold down plate readily attachable to most all truck boxes using pre-existing fastener openings formed therein; and the provision of a low cost to manufacture and install hold down plate.

BRIEF DESCRIPTION OF THE DRAWING

In the accompanying drawing:

FIG. 1 is a side elevational view of a pick up truck with a camper unit in place within the truck box;

FIG. 2 is an elevational view of the present hold down plate taken along line 2—2 of FIG. 1;

FIG. 3 is a plan view of FIG. 2; and

FIG. 4 is a view similar to FIG. 2 but on a reduced scale and showing a modified plate.

DETAILED DESCRIPTION OF THE PREFERRED EMBODIMENTS

With continuing reference to the drawing wherein applied reference numerals indicate parts similarly identified in the following description, the reference numeral 1 indicates a typical camper unit having a lower portion 1A which fits within the confines of a truck box 2 of a pick up truck 3. Said box includes sidewalls as at 4 and a front wall structure at 5. Standard box construction includes a sidewall flange at 4A (FIG. 2) which is inwardly directed and which overlies front wall 5. Sidewall flange 4A is a continuation of box sidewall 4, the same being reversed along a rolled edge 4B (FIG. 3). Accordingly, the corner structure of a truck box is extremely strong.

The present plate is indicated generally at 6 with a major portion thereof at 7 adapted for placement against truck box components. Apertures at 8 in the plate are disposed so as to be in alignment with pre-existing openings in the overlapped box components 4A and 5. Fastener assemblies conventionally secure box components 4A and 5 to one another.

A secondary portion of the plate is indicated at 9 which is offset from a plane containing the plate's major portion 7. Said secondary portion is provided with an opening at 10 within which may be received at hook 11 of a tie down arrangement 12. Between major portion 7 and secondary portion 9 of the plate is an intermediate segment or portion 13 which provides the desired offset for secondary portion 9 whereby the same may project outwardly past edge 4B and sidewall 4 of the truck box. Accordingly portion 9 is supported in place against rolled edge 4B of the sidewall which, of course, is extremely rigid.

Indicated at 14 are fastener assemblies which may be similar to those initially installed during truck box assembly, or somewhat longer if necessary, for passage through the plate. To further secure the present plate in place, a bend at 15 (FIG. 3) is located so as to at least partially seat against rolled edge 4B which curves inwardly from truck box top to bottom.

In FIG. 4, a somewhat modified plate at 6' has a major portion at 7' apertured at 8' in an assymetrical manner to enable canting of the plate for those installations where the inward curvature of box rolled edge 4B' is accentuated. In such instances, a bend of the plate may fully seat along said edge. Other plate portions are identified by prime reference numerals which correspond to reference numerals identifying similar structure of the earlier described form of the invention.

In use, the plate is installed during or after truck assembly with clearance between box and cab being adequate for tool entry. The plate is secured in place by fastener assemblies 14 whereupon the tie down means 12 and hold 11 are engaged with plate opening 10. The tie down means normally includes a tensioning member such as a turnbuckle 16 which may have one end secured to an eye bolt (not shown) on the camper structure extending outwardly over the box sidewalls 4. Tightening of turnbuckle 16 seats the camper against front wall 5 of the truck box. Loads imparted to hold down plate 6 are borne by fastener assemblies 8, rolled edge 4B of the truck box and by box front wall structure 5. The widely spaced fasteners 14, large surface area and rolled edge support of the plate render the plate secure against all anticipated loads. No additional hardware need be mounted on the truck box other than a pair of the present plates.

While we have shown but a few embodiments of the invention it is to be understood that the intended scope of the patent encompasses all variations falling within the appended claim terminology.

What we claim is:

1. In combination with the front wall structure a pick up truck box within which a camper unit is supported for transport, the improvement comprising a hold down plate adapted for securement to the forward side of the front wall of said box structure, said plate including a major portion in abutment with the forward side of said wall, a secondary portion offset forwardly from said front wall and projecting laterally beyond the forward edge of the truck box sidewall and thereat defining an aperture for receiving camper tie down means, an intermediate portion between said major and secondary portions and extending forwardly from said major portion away from the box front wall.

2. The invention claimed in claim 1 wherein said major portion of the plate defines apertures spaced from one another so as to align with pre-existing fastener receiving openings in said front wall of the truck box to facilitate plate installation.

3. The invention claimed in claim 2 wherein said secondary portion of the plate is forwardly offset from said major portion a distance substantially equal to the distance a rolled edge of the box sidewall projects forwardly from said front wall of the box.

4. A hold down plate for securing a camper unit being carried in a pick up truck box against upward and rearward displacement when the truck is underway, said holddown plate comprising, a major portion for securement in an abutting manner to the forward side of the truck box front wall, a secondary portion offset forwardly from said front wall and projecting outwardly beyond the forward edge of the truck box sidewall and thereat defining an aperture, an intermediate portion between said major and secondary portions and extending forwardly from said major portion away from the box front wall, and said hold down plate aperture serving to receive an upwardly and rearwardly inclined camper unit tie down securing the camper unit against upward and rearward movement relative to the truck box when underway.

5. The hold down plate claimed in claim 4 wherein said major portion of the plate defines apertures spaced from one another so as to align with pre-existing fastener receiving openings in said front wall of the truck box to facilitate plate installation.

6. The hold down plate claimed in claim 5 wherein said secondary portion of the plate is forwardly offset from said major portion a distance substantially equal to the distance a rolled edge of the box sidewall projects forwardly from said front wall of the box.

* * * * *